United States Patent [19]

Tsuchiya et al.

[11] Patent Number: 4,722,244
[45] Date of Patent: Feb. 2, 1988

[54] DIFFERENTIAL GEAR IN AN AUTOMOBILE

[75] Inventors: Fumitomo Tsuchiya; Nobuaki Katayama, both of Toyota, Japan

[73] Assignee: Toyota Jidosha Kabushiki Kaisha, Japan

[21] Appl. No.: 897,277

[22] Filed: Aug. 18, 1986

[30] Foreign Application Priority Data

Aug. 30, 1985 [JP] Japan ............................ 60-133594[U]

[51] Int. Cl.$^4$ .............................................. F16H 1/38
[52] U.S. Cl. ..................................... 74/713; 74/606 R
[58] Field of Search ............... 74/701, 710, 713, 606 R

[56] References Cited

U.S. PATENT DOCUMENTS

| | | | |
|---|---|---|---|
| 2,408,926 | 10/1946 | Griffith | 74/713 |
| 4,183,263 | 1/1980 | Osenbaugh | 74/710 X |
| 4,363,248 | 12/1982 | Brisabois | 74/710 X |
| 4,402,238 | 9/1983 | Craig | 74/710 |
| 4,635,744 | 1/1987 | Hiraiwa | 180/249 |

FOREIGN PATENT DOCUMENTS

| | | | |
|---|---|---|---|
| 0202228 | 12/1980 | European Pat. Off. | |
| 730557 | 12/1942 | Fed. Rep. of Germany | 74/713 |
| 2724468 | 1/1978 | Fed. Rep. of Germany | |
| 3000128 | 10/1980 | Fed. Rep. of Germany | |
| 2561180 | 9/1985 | France | |
| 53-128632 | 3/1978 | Japan | |
| 55-155946 | 12/1980 | Japan | |
| 2074516 | 11/1981 | United Kingdom | |

*Primary Examiner*—Rodney H. Bonck
*Assistant Examiner*—David A. Testardi
*Attorney, Agent, or Firm*—Parkhurst & Oliff

[57] ABSTRACT

A differential gear in an automobile, comprising a differential case formed by an annular unit wall structure having a cylindrical outer surface along at least a part of its length, four through holes opening at the cylindrical outer surface at generally constant circumferential intervals, and a circumferential groove on the cylindrical outer surface. Four differential pinions are radially arranged in the case between a pair of opposed side gears for simultaneously mating therewith. The four differential pinions are rotatably supported by one long and two short pinion shafts, the outer ends of which are received by the through holes of the case, respectively. An inner holder maintains a cross configuration of the pinion shafts. An outer ring is fitted on the case for engaging with the outer ends of the pinion shafts and snap ring is provided for retaining the outer ring in place.

8 Claims, 6 Drawing Figures

DIFFERENTIAL GEAR IN AN AUTOMOBILE

BACKGROUND OF THE INVENTION

1. Field of the Invention

The present invention relates to a differential gear in an automobile, the gear having four differential pinions intermated with a pair of side gears and supported by pinion shafts arranged in a cross configuration.

2. Description of the Related Art

In the conventional differential gear of the type having four differential pinions, two typical arrangements are used for the differential case and the pinion shafts. One uses a cross-configuration unit pinion shaft, such as a spider 45, as exemplarily shown in FIGS. 5 and 6 of the attached drawings. In this arrangement, the differential case must be formed by two separate case members to allow the cross-configured unit pinion shaft 45 to be assembled in the case. The two separate case members are fixed to each other by bolts 46 after the elements, such as the pinion shaft 45 and differential pinion 44, are inserted. One problems that arises with this arrangement is that the separate case members must be specially machined to enable a precise assembly of the separate case members into a unit, resulting in a decrease in the productivity and assembling rate.

The other arrangement uses a split pinion shaft consisting of one long shaft and two short shafts, with the differential case having a unit wall structure. Japanese Unexamined Patent Publication No. 55-155946 discloses such an arrangement in which one long shaft and two short shafts are coupled together by an inner block. The outer ends of the shafts are received by apertures provided in the case wall and the apertures are partially covered by an outer ring member which restricts the radial outward movement of the shafts and allows the shafts to freely rotate. In FIG. 1 of that Publication, the outer ring is welded to the case. It is, however, impossible to disassemble the differential gear for service or repair if the outer ring is welded to the case. In FIG. 4 of that Publication, the outer ring consists of a discontinuous wire ring having elasticity. This may allow easy assembly and disassembly, but will not ensure that the outer ring is retained in place, or reliably retain the pinion shafts, since the outer ring is expandable. In general, the outer ring loosely holds the pinion shifts to enable the pinion shafts to freely rotate.

Japanese Unexamined Utility Model Publication No. 53-128632 discloses a differential gear having a single straight pinion shaft having notched ends. A discontinuous ring is mounted on the differential case to retain the pinion shaft. This ring is held in place by the outer ring gear. As in the previous case, however, the discontinuous ring cannot reliably retain the cross pinion shafts and the outer ring itself cannot be firmly retained since it is only surrounded by the outer ring gear.

SUMMARY OF THE INVENTION

It is an object of the present invention to provide a differential gear in an automobile in which a differential case is formed as a one piece structure, to enable the manufacturing cost to be reduced. It is another object of the present invention to provide a differential gear in an automobile in which the assembly and disassembly of the gear can be easily carried out.

According to the present invention, there is provided a differential gear in an automobile, comprising: a differential case formed by an annular unit wall structure having a cylindrical outer surface along at least a part of its length, four through holes opening at the cylindrical outer surface at generally constant circumferential intervals and a circumferential groove on the cylindrical outer surface, the differential case being rotatable about an axis; a pair of opposed side gears rotatably arranged in the differential case about the axis; four differential pinions radially arranged in the case about the axis between the pair of opposed side gears for simultaneous mating therewith; a first pinion shaft generally diametrically extending through the case for rotatably supporting two of the differential pinions and having opposite outer ends received by two of the through holes, respectively; second and third short pinion shafts extending perpendicular to the first pinion shaft for rotatably supporting the remaining differential pinions, respectively, each of the second and third pinion shafts having an inner end which abuts against the first pinion shaft at the center portion thereof, and an outer end received by one of the through holes; an inner holder means in the case for retaining the second and third pinion shafts relative to the first pinion shaft so as to maintain a cross configuration of the pinion shafts; an outer ring means fitted on the cylindrical outer surface of the differential case for engaging with the outer ends of the first, second, and third pinion shafts, to restrict the radial outward movement thereof; and a snap ring inserted in the circumferential groove of the cylindrical outer surface of the differential case to retain the outer ring means in place.

BRIEF DESCRIPTION OF THE DRAWINGS

The other objects and further features of the present invention will be understood from the following description of the preferred embodiment according to the present invention, with reference to the drawings, in which.

DESCRIPTION OF THE PREFERRED EMBODIMENT

Figure 4:
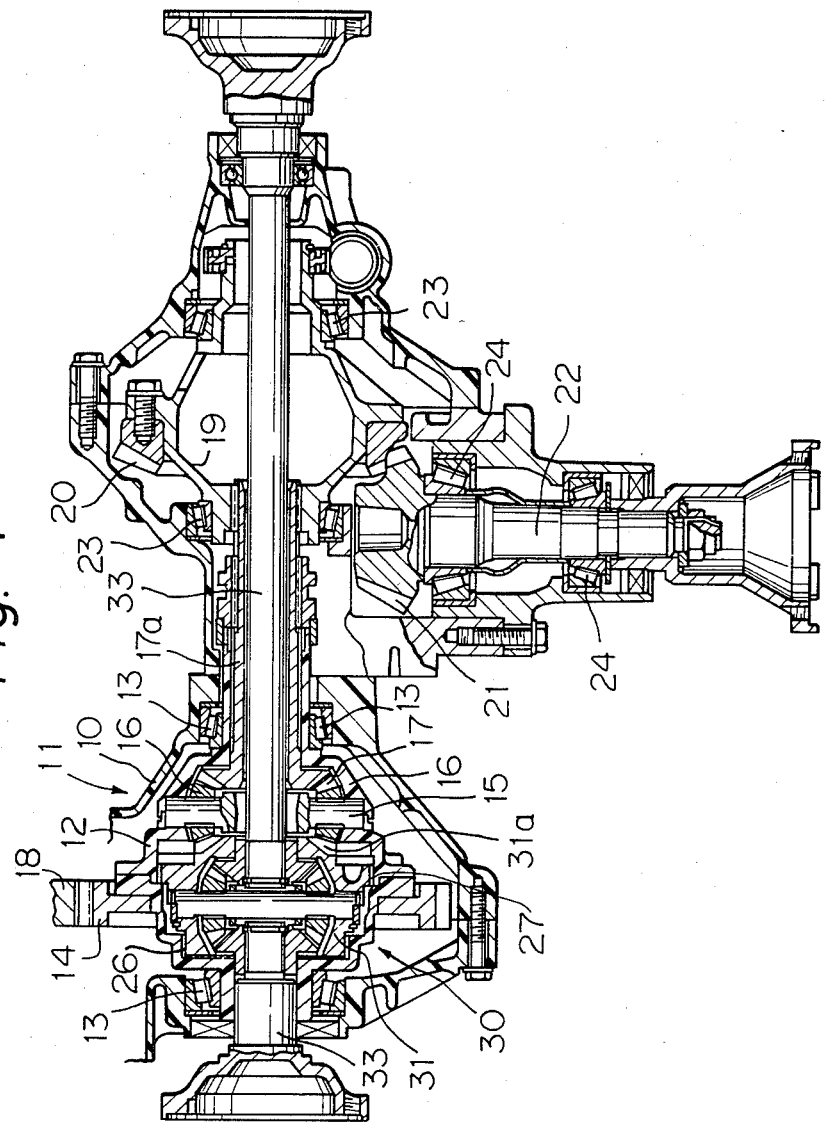
FIG. 4 is a view of a transaxle of a front transverse engine four wheel drive automobile according to the present invention.
Figure 5:
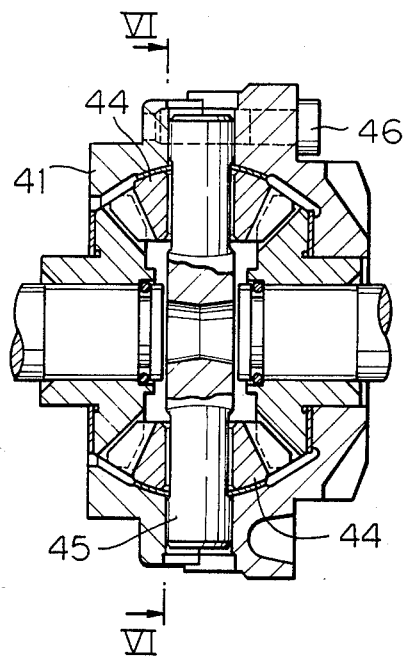
FIG. 5 is a view of a differential gear of a prior art.
Figure 6:
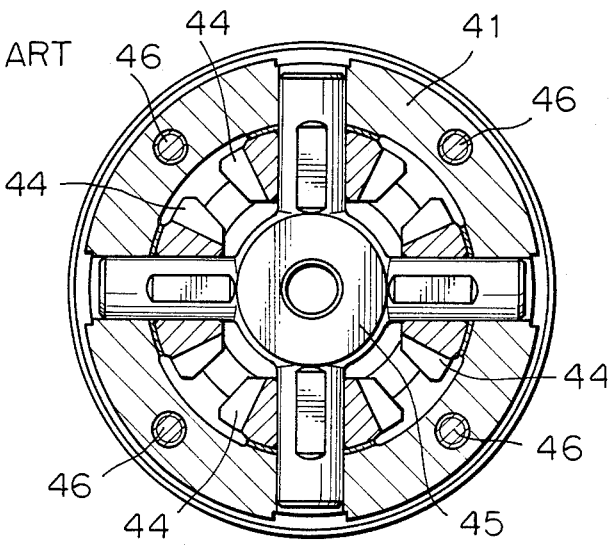
FIG. 6 is a view of the differential gear of FIG. 5 in section, taken along the lines VI—VI in FIG. 5.

FIG. 4 shows a transaxle of a front transverse engine four wheel drive automobile, having a transaxle case 10 within which a center differential gear 11 is arranged. The center differential gear 11 comprises a large center differential case 12 which is rotatably supported at the transaxle case 10 by a pair of tapered roller bearings 13. The center differential case 12 has a ring gear 14 fixed on the peripheral flange of the case, which is normally mated with a drive gear 18 on an output shaft of a transmission (not shown), and thus the center differential case 12 can be rotated from the transmission. The center differential gear 11 also comprises pinion shafts 15 fixed on the center differential case 12 on which differential pinions 16 are secured. The differential pinions 16 are mated with a pair of side gear 17 and 31a, thus the rotation of the center differential case 12 is transferred to a small front differential case 31 of a front differential gear 30 through one of the side gears 31a and to a propeller shaft through the other side gear 17.

The side gear 17 on the right hand side in FIG. 4 is integrally formed on the side surface of a tubular shaft 17a which is connected at the other end thereof to a ring gear mount 19 in a rotation transferring manner. The ring gear mount 19 carries a ring gear 20 which mates with a drive pinion 21 on a shaft 22, which in turn is connected to a propeller shaft (not shown) to drive the rear wheels. As will be clear, the ring gear mount 19 and the shaft 22 are rotatably supported at the transaxle case 10 by tapered roller bearings 23 and 24, respectively.

Figure 1:
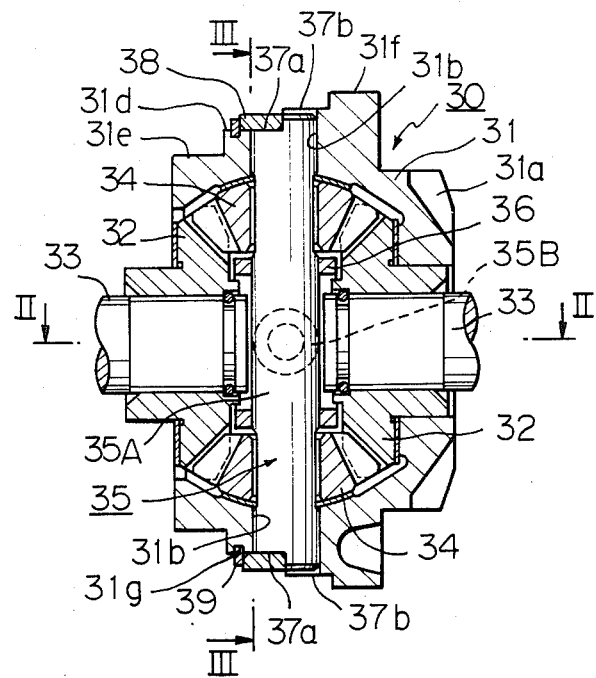
FIG. 1 is a view of a differential gear according to the present invention and showing a part of FIG. 4 on an enlarged scale.
Figure 2:
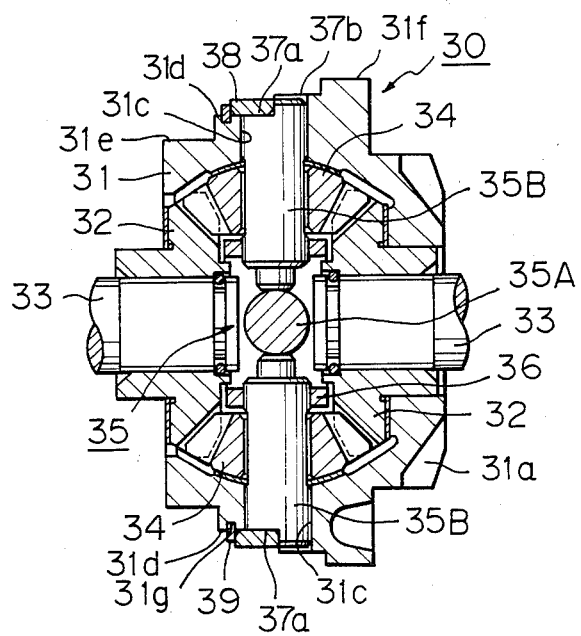
FIG. 2 is ia a view of the differential gear of FIG. 1 in section, taken along the lines II—II in FIG. 1.
Figure 3:
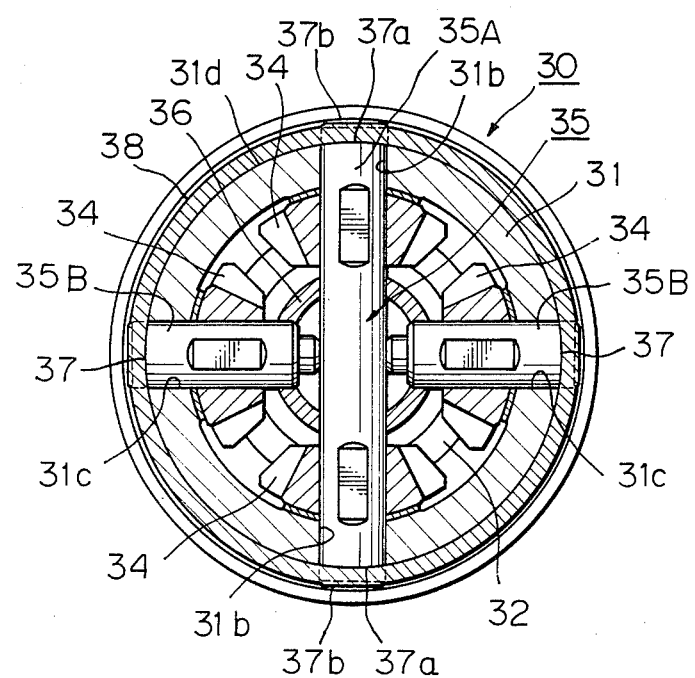
FIG. 3 is a view of the differential gear of FIG. 1 in section, taken along the lines III—III in FIG. 1.

FIGS. 1 to 3 show the front differential gear 30 in greater detail. One feature of the present invention is that the front differential case 31 is formed by an annular unit wall structure having a cylindrical outer surface about an axis. The outer surface comprises three concentric regions, namely, as viewed lengthwise of the case, an intermediate or central region 31d and end regions 31e and 31f on either side of the intermediate region 31d. The diameter of the outer surface of the one end region 31e is smaller than that of the intermediate region 31d. The diameter of the outer surface of the other end region 31e is larger than that of the intermediate region 31d. As shown in FIG. 4, the front differential case 31 is inserted in the center differential case 12 and rotatably supported therein by bushings 26 and 27 which are supplied on the outer surface of the end regions 31e and 31f of the front differential case 31, respectively. The side gear 31a, for constituting the center differential gear 11, is integrally formed on the side surface of the front differential case 31.

As shown in FIGS. 1 to 3, the differential case 31 has four securing through holes 31b and 31c opening at the intermediate outer surface 31d at constant circumferential intervals. Adjacent to the securing through holes 31b and 31c, a circumferential groove 31g is provided on the intermediate outer surface 31d.

The inner cavity extends through the front differential case 31 along the axis thereof and has opposite openings. A pair of side bevel gears 32 are opposedly inserted in the front differential case 31. Each of the side bevel gears 32 has a stem portion. One of the side bevel gears 32 is rotatably supported by the cavity opening wall at the right hand in FIG. 1. The diameter of the left hand cavity opening wall is larger than that of the right and, so that the side bevel gears 32 and other elements can be inserted in and removed from the front differential case 31. The bearing surface for the left hand side bevel gear 32 is provided in the center differential case 12, as shown in FIG. 4. The side bevel gears 32 are connected to front axle shafts 33 in a rotation transferring manner for driving front wheels (not shown), respectively.

Four differential bevel pinions 34 are radially arranged in the front differential case 31 about the enter axis thereof between the opposed side gears 32. The differential bevel pinions 34 mate with the side gears 32 simultaneously, for achieving a well-known differential action. The differential pinons 34 are rotatably supported by a cross-configured pinion shaft 35 constituted by one long pinion shaft 35A and two short pinion shafts 35B extending perpendicular to the long pinion shaft 35A. The long pinion shaft 35A extends through the front differential case 31 and is received at its opposite ends by two of the securing through holes 31b. The outer ends of the short pinion shafts 35B are received by the remaining securing through holes 31c, respectively. The inner ends of the short pinion shafts 35B abut against the long pinion shaft 35A at the center portion thereof.

At the central part in the front differential case 31, an inner holder 36 retains the short pinion shafts 35B relative to the long pinion shaft 35A so as to maintain the cross configuration of the pinion shafts. The inner holder 36 is formed by a hollow tube having four through holes at constant circumferential intervals for receiving the long and short pinion shafts 35A and 35B together.

The outer ends of each of the long and short pinion shafts 35A and 35B are notched so that each end comprises a stepped end surface having a lower step 37a, a higher step 37b, and a riser between the steps 37a and 37b. The lower step 37a of the end surface is defined by an arc of a circle having a radius identical to that of the intermediate cylindrical outer surface 31d so that the lower end surfaces 37a of all outer ends of the pinion shafts 35A and 35B can be located coplanarly to the intermediate cylindrical outer surface 31d when assembled together. An outer cylindrical ring 38 is inserted beyond the small diameter outer surface region 31e and fitted on the intermediate outer surface region 31d, engaging with the lower steps 37a of the outer ends of the pinion shafts 35A and 35B to fast restrict the radial outward movement of the pinion shafts. Finally, a snap ring 39 is inserted in the circumferential groove 31g of the intermediate cylindrical outer surface 31d to retain the outer ring in place. The outer ring 36 abuts at one side thereof against the risers between the steps 37a and 37b of the outer ends of the pinion shafts 35A and 35B, thus it is retained between the risers and the snap ring 39. This further prevents the pinion shafts 35A and 35B from rotating in the securing through holes 31a and 31b.

When assembling the front differential gear 30, the inner elements, such as the side gears 32, differential pinions 34, and the inner holder 36 are inserted in the differential case 31 as shown in FIGS. 1 to 3. The differential pinions 34 can locate themselves in place by the mating relationship with the side gears 32 which are suitably supported, even if they are not yet supported by the respective pinion shafts 35A and 35B. Then the long pinion shafts 35A are inserted first, passing through the securing through holes 31b, two differential pinions 34 and the inner holder 36. The short pinion shafts 35B are next inserted one by one, passing through the securing through hole 31c, the differential pinion 34 and the inner holder 36 until the inner end of the short pinion shafts 35B abuts against the long pinion shafts 35A at the central part thereof. Thereafter, the outer ring 38 is fitted on the intermediate cylindrical outer surface region 31d and the snap ring 39 is inserted in the circumferential groove 31g. There is no further assembling step as in the prior art, wherein the differential case is made by separate case members which must be joined exactly for providing a single rotating body. This assembly is ready to be inserted in the center differential gear case 12. The disassembling operation can be carried out by reversing these steps.

It will be understood that the differential gear according to the present invention makes it possible to reduce the cost of manufacture and facilitate the assembly work.

We claim:

1. A differential gear in an automobile, comprising:
a differential case formed by an annular unit wall structure having an intermediate cylindrical outer surface along at least a part of its length, four through holes opening at said cylindrical outer surface at generally constant circumferential intervals and a circumferential groove on said cylindrical outer surface, said differential case being rotatable about an axis;
a pair of opposed side gears rotatably arranged in said differential case about said axis;
four differential pinions radially arranged in said case about said axis and located between said pair of opposed side gears for simultaneously mating therewith;
a first pinion shaft generally diametrically extending through said case for rotatably supporting two of said differential pinions and having opposite outer ends received by two of said through holes, respectively;
second and third short pinion shafts extending perpendicularly to said first pinion shaft for rotatably supporting the remaining differential pinions, respectively, each of said second and third pinion shafts having an inner end which abuts against the first pinion shaft at a center portion thereof and an outer end received by one of said through holes;
an inner holder means in said case for retaining said second and third pinion shafts relative to said first pinion shaft so as to maintain a cross configuration of said pinion shafts;
detachable rigid continuous outer ring means fitted on said intermediate cylindrical outer surface of the differential case for engaging with the outer ends of said first, second and third pinion shafts to restrict the radially outward movement thereof; and
a snap ring inserted in said circumferential groove of said intermediate cylindrical outer surface of the differential case to removably retain said outer ring means in place.

2. A differential gear according to claim 1, wherein said side gears and said differential pinions are bevel gears.

3. A differential gear according to claim 2, wherein each of said outer ends of said first, second and third pinion shafts comprises a stepped end surface having a lower step, a higher step and a riser between the steps, said outer ring means covering said lower step and abutting against said riser.

4. A differential gear according to claim 3, wherein said lower step of said end surface is defined by an arc of a circle having a radius identical to that of said intermediate cylindrical outer surface.

5. A differential gear according to claim 4, wherein said cylindrical case has further cylindrical outer surfaces on either side of said intermediate cylindrical outer surface at least one of said further cylindrical outer surfaces having a diameter smaller than that of said intermediate cylindrical outer surface.

6. A differential gear according to claim 5, wherein said inner holder means comprises a hollow cylindrical member having four through holes at constant circumferential intervals for receiving said first, second, and third pinion shafts.

7. A differential gear according to claim 6, wherein said annular unit wall structure has a side gear profile on a side surface thereof.

8. A differential gear according to claim 7, wherein said differential case is rotatably inserted in a further case which has at least one pinion gear mating with said side gear for rotating said differential case.

* * * * *